US011391941B2

(12) United States Patent
Low et al.

(10) Patent No.: US 11,391,941 B2
(45) Date of Patent: *Jul. 19, 2022

(54) REFRACTIVE BEAM STEERING DEVICE USEFUL FOR AUTOMATED VEHICLE LIDAR

(71) Applicant: APTIV TECHNOLOGIES LIMITED, St. Michael (BB)

(72) Inventors: Yew Kwang Low, Singapore (SG); Kok Wee Yeo, Singapore (SG); Chee Keng Yeo, Singapore (SG)

(73) Assignee: APTIV TECHNOLOGIES LIMITED, St. Michael (BB)

(*) Notice: Subject to any disclaimer, the term of this patent is extended or adjusted under 35 U.S.C. 154(b) by 148 days.

This patent is subject to a terminal disclaimer.

(21) Appl. No.: 16/811,021

(22) Filed: Mar. 6, 2020

(65) Prior Publication Data

US 2020/0257107 A1 Aug. 13, 2020

Related U.S. Application Data

(63) Continuation of application No. 15/227,622, filed on Aug. 3, 2016, now Pat. No. 10,598,922.

(51) Int. Cl.
*G02B 26/08* (2006.01)
*G01S 17/42* (2006.01)
*G01S 17/931* (2020.01)
*G01S 7/481* (2006.01)

(52) U.S. Cl.
CPC ........ *G02B 26/0875* (2013.01); *G01S 7/4815* (2013.01); *G01S 7/4817* (2013.01); *G01S 17/42* (2013.01); *G01S 17/931* (2020.01)

(58) Field of Classification Search
CPC ..... G02B 26/0875; G01S 7/481; G01S 17/42; G01S 17/93; G01S 7/4815; G01S 7/4817
See application file for complete search history.

(56) References Cited

U.S. PATENT DOCUMENTS

| 5,861,992 A | 1/1999 | Gelbart |
| 6,535,256 B1 | 3/2003 | Ishihara et al. |
| 7,544,945 B2 | 6/2009 | Tan et al. |
| 8,666,553 B2 | 3/2014 | Phillips et al. |
| 9,278,695 B2 | 3/2016 | Shin et al. |
| 10,018,750 B2 | 7/2018 | Zhou et al. |
| 10,598,922 B2 * | 3/2020 | Low .................. G01S 7/4817 |
| 2007/0007439 A1 | 1/2007 | Neubling |
| 2007/0181810 A1 | 8/2007 | Tan et al. |
| 2015/0049374 A1 | 2/2015 | Hofmann et al. |

FOREIGN PATENT DOCUMENTS

| CN | 102317040 | 1/2012 |
| CN | 104648403 | 5/2015 |
| CN | 104900683 | 9/2015 |
| FR | 2989148 | 10/2013 |

* cited by examiner

*Primary Examiner* — Euncha P Cherry
(74) *Attorney, Agent, or Firm* — Carlson, Gaskey & Olds, P.C.

(57) ABSTRACT

An illustrative example device for steering radiation includes an optic component including a plurality of concave surfaces on at least one side of the optic component, a plurality of radiation sources respectively aligned with the plurality of concave surfaces, and at least one actuator that selectively moves the optic component relative to the plurality of light sources to selectively change a direction of respective beams of radiation passing through the plurality of concave surfaces.

16 Claims, 2 Drawing Sheets

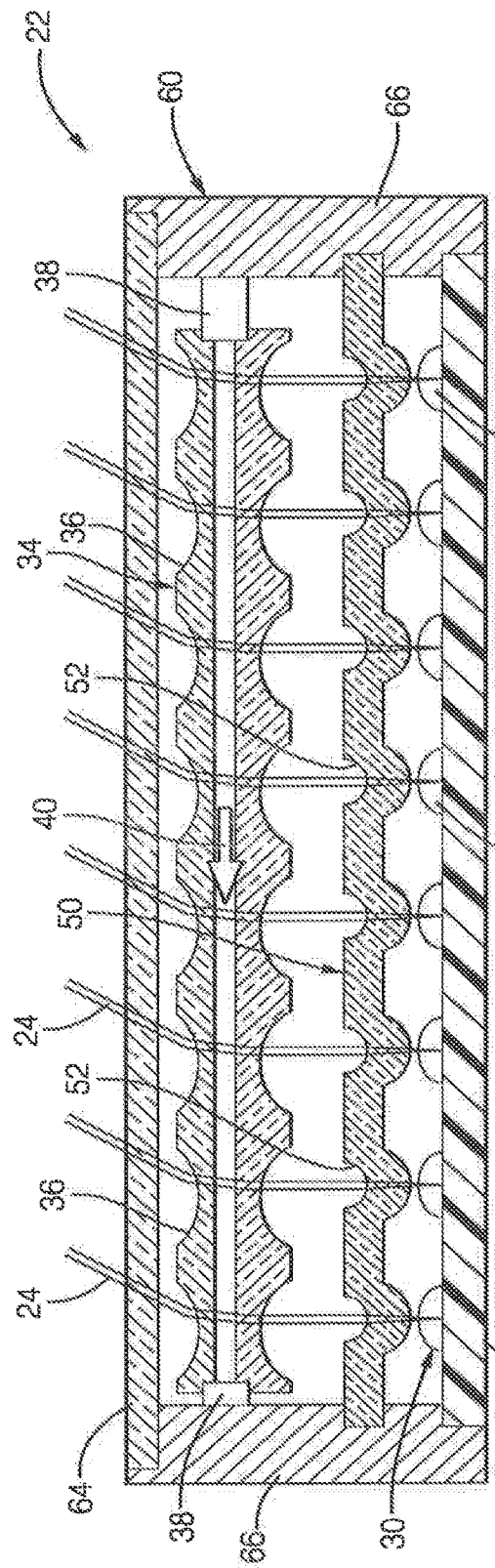
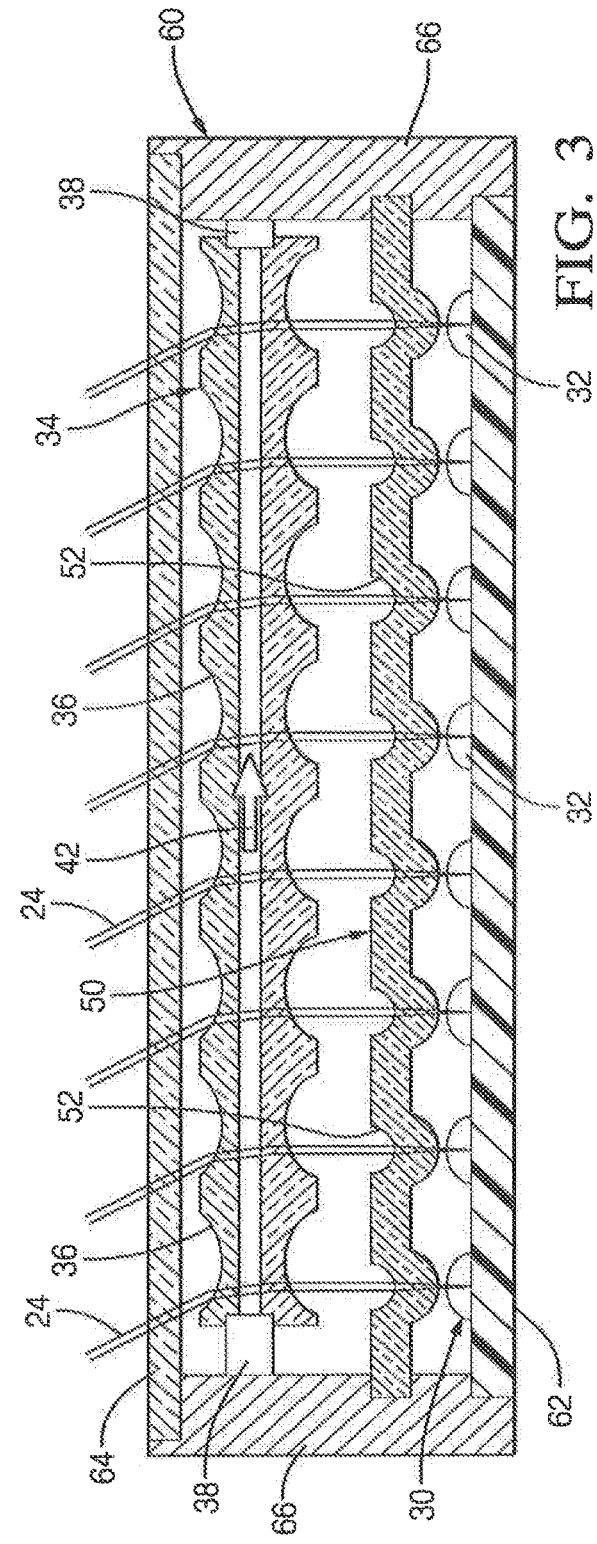

REFRACTIVE BEAM STEERING DEVICE USEFUL FOR AUTOMATED VEHICLE LIDAR

CROSS REFERENCE TO RELATED APPLICATIONS

This application is a continuation of U.S. patent application Ser. No. 15/227,622, filed on Aug. 3, 2016, now U.S. Pat. No. 10,598,922, issued on Mar. 24, 2020.

BACKGROUND

Advances in electronics and technology have made it possible to incorporate a variety of advanced features on automotive vehicles. Various sensing technologies have been developed for detecting objects in a vicinity or pathway of a vehicle. Such systems are useful for parking assist and cruise control adjustment features, for example.

More recently, automated vehicle features have become possible to allow for autonomous or semi-autonomous vehicle control. For example, cruise control systems may incorporate LIDAR (light detection and ranging) for detecting an object or another vehicle in the pathway of the vehicle. Depending on the approach speed, the cruise control setting may be automatically adjusted to reduce the speed of the vehicle based on detecting another vehicle in the pathway of the vehicle.

There are different types of LIDAR systems. Flash LIDAR relies upon a single laser source to illuminate an area of interest. Reflected light from an object is detected by an avalanche photodiode array. While such systems provide useful information, the avalanche photodiode array introduces additional cost because it is a relatively expensive component. Additionally, the laser source for such systems has to be relatively high power to achieve sufficiently uniform illumination of the area of interest. Scanning LIDAR systems utilize different components compared to flash LIDAR. One challenge associated with previously proposed scanning LIDAR systems is that additional space is required for the scanning components and there is limited packaging space available on vehicles. Optical phase array LIDAR systems utilize beam multiplexing that tends to introduce relatively significant power loss.

There is a need for improvements in components for systems, such as LIDAR systems, that are lower-cost, easier to fit within small packaging constraints, and utilize power efficiently.

SUMMARY

An illustrative example device for steering radiation includes an optic component including a plurality of concave surfaces on at least one side of the optic component, a plurality of radiation sources respectively aligned with the plurality of concave surfaces, and at least one actuator that selectively moves the optic component relative to the plurality of light sources to selectively change a direction of respective beams of radiation passing through the plurality of concave surfaces.

In an example embodiment having one or more features of the device of the previous paragraph, the radiation sources emit respective beams of radiation in a first direction and the at least one actuator selectively moves the optic component in a second direction that is transverse to the first direction.

In an example embodiment having one or more features of the device of either of the previous paragraphs, the at least one actuator comprises a first actuator on one side of the optic component and a second actuator on a second side of the optic component.

In an example embodiment having one or more features of the device of any of the previous paragraphs, the at least one actuator selectively moves the optic component in a third direction that is opposite and parallel to the second direction.

In an example embodiment having one or more features of the device of any of the previous paragraphs, the at least one actuator comprises a micro-electro-mechanical (MEMs) actuator.

An example embodiment having one or more features of the device of any of the previous paragraphs includes a plurality of collimating lenses respectively between the laser diodes and the concave surfaces.

An example embodiment having one or more features of the device of any of the previous paragraphs includes a housing including a base, a cover spaced from the base at least one side wall between the base and the cover, and wherein the radiation sources are supported within the housing near the base, the optic component is supported within the housing between the radiation sources and the cover, and the at least one actuator selectively moves the optic component in opposite directions generally parallel to the cover In an example embodiment having one or more features of the device of any of the previous paragraphs, the at least one sidewall comprises two oppositely facing side walls, the at least one actuator comprises a first actuator supported on one of the two oppositely facing side walls and a second actuator supported on the other of the two oppositely facing side walls, and the first and second actuators move the optic component respectively closer to or further away from the two oppositely facing side walls.

In an example embodiment having one or more features of the device of any of the previous paragraphs, the radiation sources, the optic component and the at least one actuator are all within the housing, the at least one actuator has a portion supported on the housing, and the optic component is supported by another portion of the at least one actuator.

An illustrative example embodiment of a method of steering radiation includes directing radiation through a plurality of concave surfaces on at least one side of an optic component and selectively moving the optic component to control a direction of respective beams of radiation passing through the plurality of concave surfaces.

An example embodiment having one or more features of the method of any of the previous paragraphs includes emitting respective beams of radiation in a first direction and selectively moving the optic component in a second direction that is transverse to the first direction.

An example embodiment having one or more features of the method of any of the previous paragraphs includes selectively moving the optic component in a third direction that is opposite and parallel to the second direction.

An example embodiment having one or more features of the method of any of the previous paragraphs includes using at least one actuator for selectively moving the optic component.

In an example embodiment having one or more features of the method of any of the previous paragraphs, the at least one actuator comprises a micro-electro-mechanical (MEMs) actuator.

An example embodiment having one or more features of the method of any of the previous paragraphs includes using laser diodes as sources of the radiation.

In an example embodiment having one or more features of the method of any of the previous paragraphs, the optic component is within a housing including a base, a cover spaced from the base at least one side wall between the base and the cover and the method includes selectively moving the optic component in opposite directions generally parallel to the cover.

An illustrative example embodiment of a LIDAR device for use on a vehicle includes an optic component including a plurality of concave surfaces on at least one side of the optic component, a plurality of radiation sources respectively aligned with the plurality of concave surfaces, and at least one actuator that selectively moves the optic component relative to the plurality of light sources, wherein a direction of respective beams of radiation passing through the plurality of concave surfaces depends on a position of the concave surfaces relative to the radiation sources.

In an example embodiment having one or more features of the LIDAR device of the previous paragraph, the at least one actuator comprises a micro-electro-mechanical (MEMs) actuator.

An example embodiment having one or more features of the LIDAR device of either of the previous paragraphs includes a housing including a base, a cover spaced from the base at least one side wall between the base and the cover, and wherein the radiation sources are supported within the housing near the base, the optic component is supported within the housing between the radiation sources and the cover, and the at least one actuator selectively moves the optic component in opposite directions generally parallel to the cover.

the at least one sidewall comprises two oppositely facing side walls, the at least one actuator comprises a first actuator supported on one of the two oppositely facing side walls and a second actuator supported on the other of the two oppositely facing side walls, and the first and second actuators move the optic component respectively closer to or further away from the two oppositely facing side walls.

In an example embodiment having one or more features of the LIDAR device of any of the previous paragraphs, the radiation sources, the optic component and the at least one actuator are all within the housing, the at least one actuator has a portion supported on the housing, and the optic component is supported by another portion of the at least one actuator Various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 2 schematically illustrates an example device for steering radiation designed according to an embodiment of this invention.

FIG. 3 schematically illustrates the example device of FIG. 2 directing beams of radiation differently than that shown in FIG. 2.

DETAILED DESCRIPTION

Figure 1:
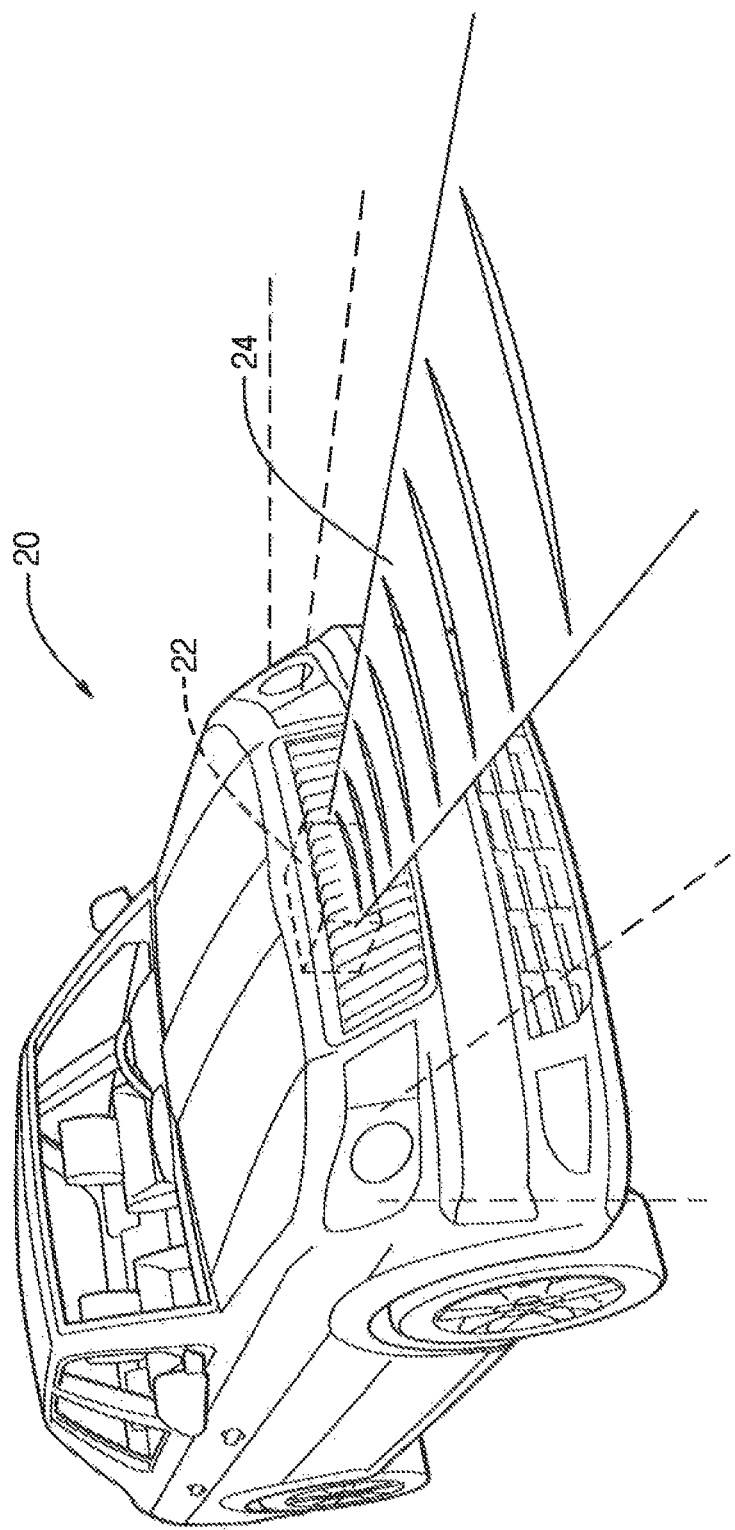
FIG. 1 schematically illustrates a vehicle including a detection device having beam steering components designed according to an embodiment of this invention.

FIG. 1 schematically illustrates a vehicle 20 including a detection device 22. One example use for the detection device 22 is to provide sensing or guidance information for a vehicle, engine or brake controller, such as an automated vehicle controller. For discussion purposes, the detection device 22 is a LIDAR device that emits at least one beam of radiation 24 that is useful for detecting objects in a vicinity or pathway of the vehicle 20. In this example, the beam of radiation 24 comprises light that is directed at a selected angle relative to the vehicle 20.

Embodiments of this invention provide additional beam steering and scanning capability while requiring lower power and occupying less space compared to other proposed arrangements. Embodiments of this invention allow for achieving a desired level of beam control using less power and occupying less space, which makes embodiments of this invention well-suited for automated vehicle LIDAR systems. In this example, the radiation comprises light. A source of radiation 30 includes a plurality of laser diodes 32. Each of the laser diodes 32 in this example emits a separate beam of light 24.

FIG. 2 schematically illustrates a portion of the LIDAR device 22 that is useful for steering radiation (e.g., the beams of light 24) in a desired direction, manner or pattern. An optic component 34 includes a plurality of concave surfaces 36 on at least one side of the optic component 34. The concave surfaces 36 are respectively aligned with the laser diodes 32 such that each beam of light 24 originates from one of the laser diodes 32 and passes through one of the concave surfaces 36.

The optic component 34 comprises a suitable optic material, such as that useful for making lenses. The concave surfaces 36 provide refractive surfaces for steering the beams of radiation 24 in a desired direction. At least one actuator 38 is associated with the optic component 34 to cause selective movement of the optic component 34 relative to the source of radiation 30 for selectively changing the direction of the beams 24. In this example, there are two actuators 38, one associated with each end of the optic component 34.

As schematically represented by the arrow 40 in FIG. 2, the actuators 38 move the optic component 34 into the illustrated position, which corresponds to movement to the left according to the drawing. The position of the optic component 34 in FIG. 2 directs the beams 24 away from the device 22 in the illustrated direction. As shown in FIG. 3, the optic component 34 is moved or translated toward the right according to the drawing as schematically shown by the arrow 42. In the position shown in FIG. 3, the concave surfaces 36 refract the beams of light 24 in the illustrated direction, which is different than that accomplished with the condition of the device 22 shown in FIG. 2.

A controller (not illustrated) of the device 22 causes desired operation of the actuators 38 to cause selective movement of the optic component 34 to realize a desired direction of radiation emanating from the device 22 or to realize a desired beam scanning pattern. Given this description, those skilled in the art will realize how to achieve a desired control strategy to realize a beam scanning pattern that will suit their particular needs.

In some example embodiments, the actuators 38 comprise micro-electro-mechanical (MEMs) actuators. Such actuators are useful for embodiments where the device 22 is intended to fit within a relatively small space. Other example embodiments include different actuators, such as piezoelectric actuators.

The example embodiment of FIGS. 2 and 3 includes a stationary optic component 50 that controls the beams emitted by the laser diodes 32. In this example, the optic component 50 comprises a plurality of collimating lenses 52 that prevent the beams emitted by the laser diodes 32 from spreading undesirably.

The source of radiation 30, the optic component 34, the actuators 38, and the collimating lenses 52 are all situated within a housing 60. In this example, the housing 60 includes a base 62, which may comprise a substrate that supports the laser diodes 32. A cover 64 comprises an optically transparent material. At least one sidewall 66 extends between the base 62 and the cover 64. In the illustrated example, the actuators 38 are at least partially supported by the housing 60. According to the arrangement shown in FIGS. 2 and 3, the actuators 38 are supported on oppositely facing sidewalls 66 of the housing 60. Other arrangements for supporting the actuators within a housing are possible. The stationary optic component 50 is also supported by the sidewalls 66 in this example. One example embodiment includes copper traces etched into the cover 64 for facilitating providing power and signals to the actuators 38.

As can be appreciated from the drawings, the laser diodes 32 emit the beams of light 24 in a first direction (e.g., vertical according to the drawings). The actuators 38 selectively move the optic component 34 in a second direction that is transverse to the first direction (e.g., to the right or left according to the drawing). The actuators 38 also selectively move the optic component 34 in a third direction that is opposite and parallel to the second direction (e.g., to the left or right according to the drawing).

One feature of the illustrated embodiment is that it allows for realizing a LIDAR (light detection and ranging) device 22 that is useful for automated vehicle applications. The illustrated embodiment is capable of fitting within very tight packaging constraints, operating using relatively low power, and providing a wide range of beam direction capability. Another feature of the illustrated example embodiment is that it reduces the number of components compared to devices that rely upon an external mirror arrangement, such as a MEMs mirror for directing light. With the illustrated arrangement, no external directing mirrors are needed, no additional beam folding space is required and there is less emitter energy loss compared to other proposed LIDAR devices.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for steering radiation, the device comprising:
a plurality of radiation sources that collectively emit a plurality of beams of radiation;
an optic component including a plurality of concave surfaces on each of an entry side of the optic component facing toward the plurality of radiation sources and an exit side of the optic component facing away from the entry side, the plurality of concave surfaces being configured to control a direction of the plurality of beams beyond the exit side of the optic component; and
at least one actuator that selectively moves the optic component to change a position of the concave surfaces relative to the plurality of radiation sources to selectively change the direction of the plurality of beams.

2. The device of claim 1, comprising a housing and wherein
the housing comprises a base that supports the plurality of radiation sources and a plurality of sidewalls extending between the base and the optic component;
the at least one actuator is supported on at least one of the sidewalls; and
the at least one of the sidewalls includes a conductive metal for providing power to the at least one actuator.

3. The device of claim 2, wherein
the at least one actuator includes a first actuator and a second actuator arranged on opposite ends of the optic component;
the at least one sidewall comprises a first side wall and a second side wall on opposite sides of the optic component;
the first actuator is supported on the first side wall and the second actuator is supported on the second side wall; and
the first and second actuators move the optic component respectively closer to or further away from the first and second side walls.

4. The device of claim 2, wherein the conductive metal comprises etched copper on the at least one of the sidewalls.

5. The device of claim 1, wherein
each of the concave surfaces on the entry side of the optic component is aligned with one of the plurality of radiation sources;
each of the concave surfaces on the entry side of the optic component is spaced a first distance from the aligned one of the plurality of radiation sources; and
each first distance is equal to all others of the first distances.

6. The device of claim 5, wherein the plurality of concave surfaces are arranged in a straight line across each of the sides of the optic component.

7. The device of claim 5, wherein each of the plurality of concave surfaces on the exit side of the optic component is aligned with one of the plurality of radiation sources.

8. The device of claim 1, wherein the radiation sources comprise laser diodes.

9. The device of claim 8, comprising a plurality of collimating lenses each positioned between one of the laser diodes and an aligned one of the plurality of concave surfaces on the entry side of the optic component.

10. The device of claim 9, wherein the plurality of collimating lenses are on a single-piece stationary optic component.

11. The device of claim 1, comprising a controller that controls the at least one actuator to move the optic component to direct the beams of radiation in an object-detecting scanning pattern.

12. A method of detecting an object, the method comprising:
directing beams of radiation through an optic component that includes a plurality of concave surfaces on each of an entry side of the optic component and an exit side of the optic component facing away from the entry side, the plurality of concave surfaces being configured to control a direction of the beams beyond the exit side of the optic component; and
moving the optic component in a direction transverse to the beams of radiation to selectively change the direction of the beams in an object-detecting scanning pattern.

13. The method of claim 12, wherein
a first actuator is situated on one side of the optic component;
a second actuator is situated on another side of the optic component; and
moving the optic component includes extending the first actuator while retracting the second actuator.

14. The method of claim 12, wherein
a plurality of radiation sources emit the beams of radiation;
each of the concave surfaces on the entry side of the optic component is aligned with one of the plurality of radiation sources;
each of the concave surfaces on the entry side of the optic component is spaced a first distance from the aligned one of the plurality of radiation sources; and
each first distance is equal to all others of the first distances.

15. The method of claim 14, wherein the plurality of concave surfaces are arranged in a straight line across each of the sides of the optic component.

16. The method of claim 14, wherein each of the plurality of concave surfaces on the exit side of the optic component is aligned with one of the plurality of radiation sources.

* * * * *